United States Patent
Natarajan et al.

(10) Patent No.: US 10,806,077 B2
(45) Date of Patent: Oct. 20, 2020

(54) AGRICULTURAL COMBINE WITH ELECTROSTATIC GRAIN CLEANER

(71) Applicant: Deere & Company, Moline, IL (US)

(72) Inventors: Kamalakannan Natarajan, Pune (IN); Karthikeyan Narayanan, Chennai (IN); Anupam Mukhopadhyay, Howrah (IN)

(73) Assignee: DEERE & COMPANY, Moline, IL (US)

( * ) Notice: Subject to any disclaimer, the term of this patent is extended or adjusted under 35 U.S.C. 154(b) by 138 days.

(21) Appl. No.: 16/124,595

(22) Filed: Sep. 7, 2018

(65) Prior Publication Data

US 2019/0141892 A1  May 16, 2019

(30) Foreign Application Priority Data

Nov. 10, 2017 (IN) .............................. 201721040119

(51) Int. Cl.
*A01D 41/12* (2006.01)
*A01F 12/44* (2006.01)
(Continued)

(52) U.S. Cl.
CPC ..... *A01D 41/1252* (2013.01); *A01D 41/1217* (2013.01); *A01D 90/12* (2013.01);
(Continued)

(58) Field of Classification Search
CPC ............ A01D 41/1252; A01D 41/1217; A01D 41/1208; A01D 41/1276; A01D 90/10;
(Continued)

(56) References Cited

U.S. PATENT DOCUMENTS

| 4,095,625 A | * | 6/1978 | Marpe | .................. B65G 69/186 |
| | | | | 141/286 |
| 5,113,643 A | * | 5/1992 | Peterson | ............ A01D 41/1252 |
| | | | | 56/153 |

(Continued)

FOREIGN PATENT DOCUMENTS

| CH | 314900 A | 7/1956 |
| CN | 107018766 A | 8/2017 |

(Continued)

OTHER PUBLICATIONS

European Search Report issued in counterpart application No. 18204661.5 dated Apr. 1, 2019. (5 pages).

*Primary Examiner* — Robert E Pezzuto
*Assistant Examiner* — Adam J Behrens
(74) *Attorney, Agent, or Firm* — Michael Best & Friedrich LLP

(57) ABSTRACT

An agricultural combine includes a self-propelled agricultural harvesting vehicle and a feederhouse extending forward from the vehicle. The combine further includes a rotor and concave arrangement for threshing and separating grain received in the feederhouse. A cleaning shoe is disposed below the rotor and concave arrangement. The combine moreover includes a grain tank for receiving and accumulating grain from the cleaning shoe and an unloading conveyor for conveying grain from the grain tank. An electrostatic grain cleaner is coupled to a distal end of the conveyor for electrostatically cleaning grain from the grain tank.

12 Claims, 4 Drawing Sheets

(51) Int. Cl.
 *A01F 12/54* (2006.01)
 *A01D 41/127* (2006.01)
 *A01D 43/08* (2006.01)
 *A01D 43/073* (2006.01)
 *A01D 90/12* (2006.01)
 *A01D 90/10* (2006.01)
 *A01F 12/60* (2006.01)

(52) U.S. Cl.
 CPC ............... *A01F 12/44* (2013.01); *A01F 12/54* (2013.01); *A01D 90/10* (2013.01); *A01F 12/60* (2013.01)

(58) Field of Classification Search
 CPC .......... A01D 90/12; A01D 41/12–1278; A01D 43/0635; A01D 43/073; A01D 43/087; A01D 61/00–04; A01F 12/44–446; A01F 12/54; A01F 12/60
 See application file for complete search history.

(56) References Cited

U.S. PATENT DOCUMENTS

| | | | | |
|---|---|---|---|---|
| 6,225,587 | B1* | 5/2001 | Lundahl | A23B 9/06 209/127.4 |
| 6,736,722 | B1* | 5/2004 | Pope | A01D 41/1208 460/119 |
| 2011/0094199 | A1* | 4/2011 | Farley | A01F 12/46 56/14.6 |

FOREIGN PATENT DOCUMENTS

| | | |
|---|---|---|
| DE | 2720502 A1 | 11/1978 |
| DE | 20013389 U1 | 2/2001 |
| EP | 2761983 A2 | 8/2014 |
| EP | 3238527 A1 | 11/2017 |
| RU | 2569392 C1 | 11/2015 |

\* cited by examiner

AGRICULTURAL COMBINE WITH ELECTROSTATIC GRAIN CLEANER

RELATED APPLICATIONS

None.

FIELD OF THE INVENTION

The invention described herein relates to agricultural harvesting. More particularly it relates to agricultural harvesting vehicles. Even more particularly it relates to grain cleaning methods for agricultural harvesters

BACKGROUND OF THE INVENTION

Agricultural combines are self-propelled vehicles that harvest crop materials growing in a field. Internal mechanisms inside combines receive crop plants severed from the ground, thresh them, separate grain from the remainder of the crop plants, and clean the resulting grain.

In a traditional combine, the grain is cleaned by distributing dirty grain on top of a sieve (or chaffer), blowing air upward through the sieve and through the dirty grain, and using the air friction to remove small residue particles, dust, and the like from the grain.

Once the grain is clean, it falls through the sieve to the bottom of the agricultural combine, is carried upward, and is deposited in a grain tank or grain reservoir. The clean grain is held in the grain tank and is periodically unloaded into a vehicle traveling alongside the agricultural combine.

The agricultural combine has an unloading conveyor, typically an auger, that receives grain from the grain tank, carries it outward and away from the agricultural combine, and releases it into the vehicle traveling alongside.

The process of cleaning grain is generally very efficient. It does not, however, remove substantially all of the dust and small particles that are mixed in with the grain. This is a problem. The more dust and small particles that are intermixed with the grain, the lower the price the farmer can receive for his grain. Thus, the better the farmer cleans the grain, the higher the farmer's income.

It would be beneficial to provide an additional cleaning process to remove dust and other small particles from the grain during harvesting and before the grain is transferred to the vehicle traveling alongside the combine.

It is an object of this invention to provide such a system.

SUMMARY OF THE INVENTION

In accordance with a first aspect of the invention, an agricultural combine comprises a self-propelled agricultural harvesting vehicle; a feederhouse extending forward from the vehicle; a rotor and concave arrangement for threshing and separating grain received in the feederhouse; a cleaning shoe disposed below the rotor and concave arrangement for cleaning grain; a grain tank for receiving and accumulating grain from the cleaning shoe; an unloading conveyor having a distal end for conveying grain from the grain tank; an electrostatic cleaner coupled to the distal end for receiving grain from the grain tank and for electrostatically cleaning and electrostatically cleaning the grain from the grain tank.

The electrostatic cleaner may further comprise a housing fixed to the distal end.

The electrostatic cleaner may further comprise electrostatic charge injectors that are disposed to apply a charge to grain from the grain tank leaving the distal end.

The electrostatic cleaner may further comprise a charged drum disposed inside the housing and located downstream of the electrostatic charge injectors to attract dust and small particles intermixed with the grain from the grain tank.

The electrostatic cleaner may further comprise a brush abutting the charged drum to brush dust and small particles off the drum.

The charged drum may be driven in rotation about its longitudinal axis by a motor.

The charged drum may be a right circular cylinder.

The charged drum may have a conductive outer surface.

The conductive outer surface may comprise copper.

The electrostatic charge injectors may be disposed in multiple rows extending across the width of the electrostatic cleaner.

The electrostatic charge injectors may be disposed in a top cover of the electrostatic cleaner.

The electrostatic charge injectors may extend downward from the top cover.

DETAILED DESCRIPTION OF THE PREFERRED EMBODIMENTS

Figure 1:
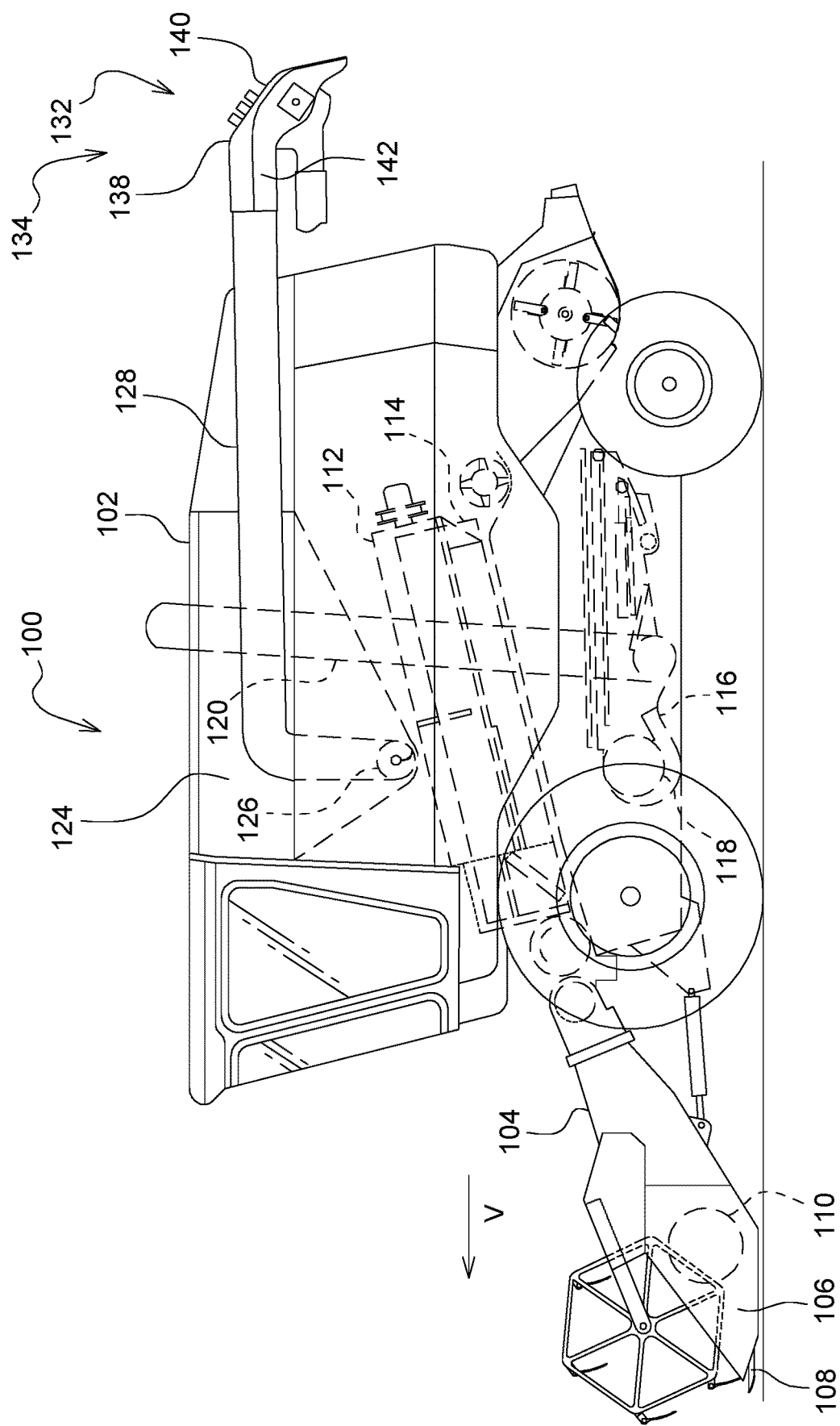
FIG. 1 is a side view of an agricultural combine in accordance with the present invention.

In FIG. 1 an agricultural combine 100 comprises a self-propelled agricultural harvesting vehicle 102 having a feederhouse 104 mounted to and extending forward from the vehicle 102, and an agricultural harvesting head 106 mounted to and extending forward from the front of the feederhouse.

Crops are severed from the ground by an elongate knife 108 that is attached to the lower front edge of the agricultural harvesting head. These crops are carried inward toward a central region of the agricultural combine with a conveyor 110. The crop is then transmitted rearward into the feederhouse 104 and is carried upward in the feederhouse by a conveyor (not shown). The crop is then received into the vehicle 102 and is conveyed between a rotor 112 and a concave grating 114. Crop (i.e. seeds) falls through apertures in the grating 114 and into a cleaning shoe 116 for further cleaning. A cleaning fan 118 mounted at the front of the cleaning shoe 116 blows crop residue separated from the crop in the cleaning shoe (commonly called "chaff") rearward.

The clean grain falls to the bottom of the cleaning shoe and is lifted upward by a clean grain elevator 120. The clean grain elevator 120 releases the clean grain at its upper end 122 and it falls into a grain tank 124.

Figure 2:
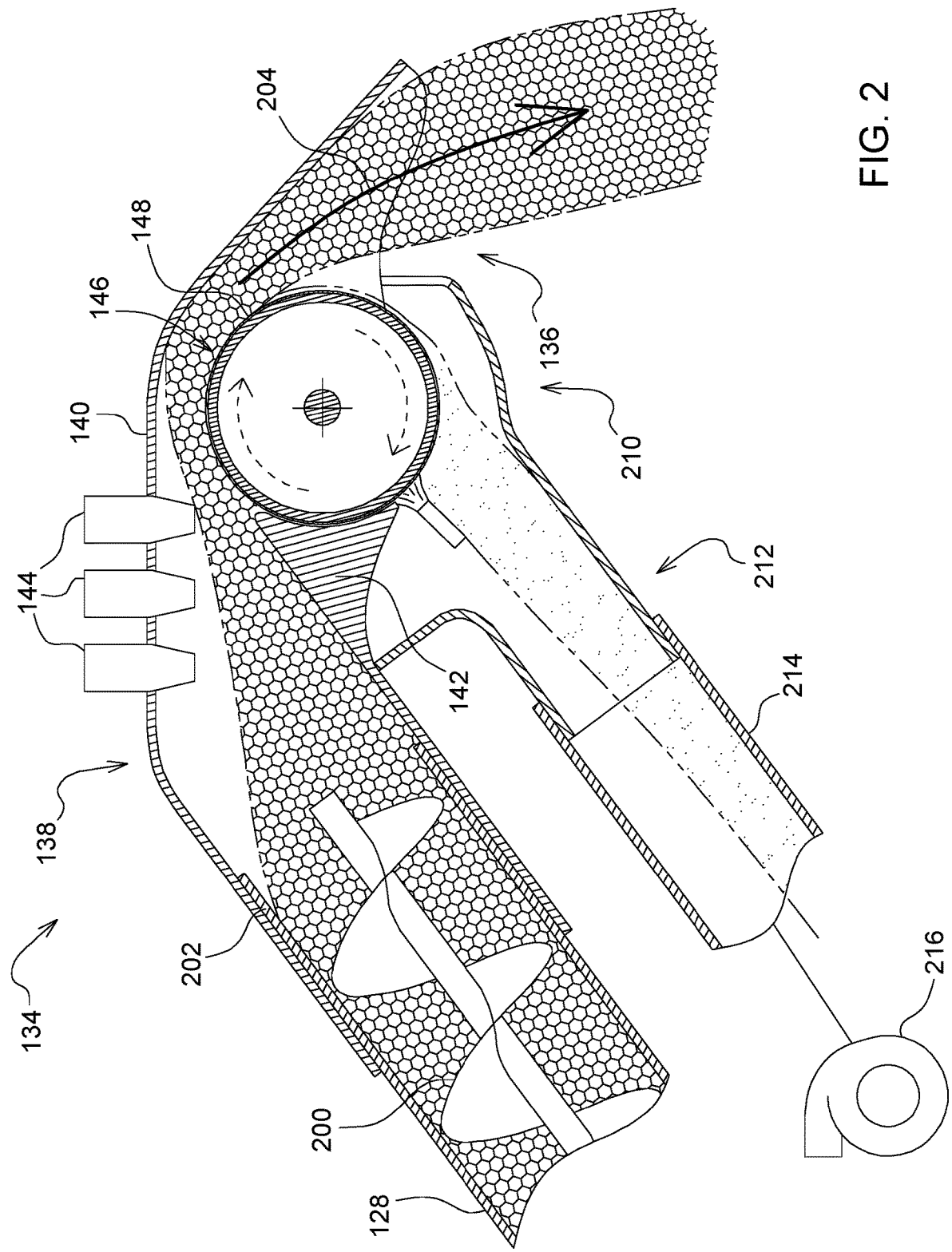
FIG. 2 shows a fractional cross-sectional view of the electrostatic cleaner of the agricultural combine of FIG. 1.

Periodically, as the grain tank 124 is filled during harvesting, a grain conveyor 126 located at the bottom of the grain tank conveys the clean grain to an unloading conveyor 128. The unloading conveyor 128 has an internal auger 200 (FIG. 2) and carries the grain to an open end 132 of the unloading conveyor 128.

The grain is released from the end of the unloading conveyor 128 into an electrostatic cleaner 134 for a second cleaning step. Once cleaned, the twice clean grain exits the electrostatic grain cleaner 134 at the outlet 136 of the electrostatic cleaner 134.

The electrostatic cleaner 134 is fixed to the end 202 of the unloading conveyor 128. Electrostatic cleaner 134 includes a housing 138 that encloses the grain as it travels through the electrostatic cleaner 134 and supports the electrostatic cleaning elements of the electrostatic cleaner 134.

The housing 138 includes a cover 140 that encloses a base 142. The cover supports several charge injectors 144. The charge injectors 144 spray the clean grain passing into the electrostatic cleaner 134 with an electrostatic charge. This electrostatic charge accumulates on the grain, the dust, and the small particles that pass through the electrostatic cleaner 134 and charges the grain, dust, and small particles.

The unloading conveyor 128 continually pushes a stream of clean grain into the housing 138, which conveys the clean grain underneath through and around the charge injectors 144. This ensures that all the clean grain (and the entrained dust and small particles) receives a space sufficient charge.

The now-charged grain flows further through the electrostatic cleaner and over a charged drum 146. The charged drum 146 is generally cylindrical and has an outer conductive surface (e.g. copper) 148. The charged drum 146 is coupled to an electrostatic charge generator to generate a charge opposite to that applied to the grain, dust, and small particles.

The charge difference between the grain/dust/small particles mixture and the conductive surface 148 causes the dust and small particles to be electrostatically attracted to and to accumulate on the conductive surface 148.

Figure 3:
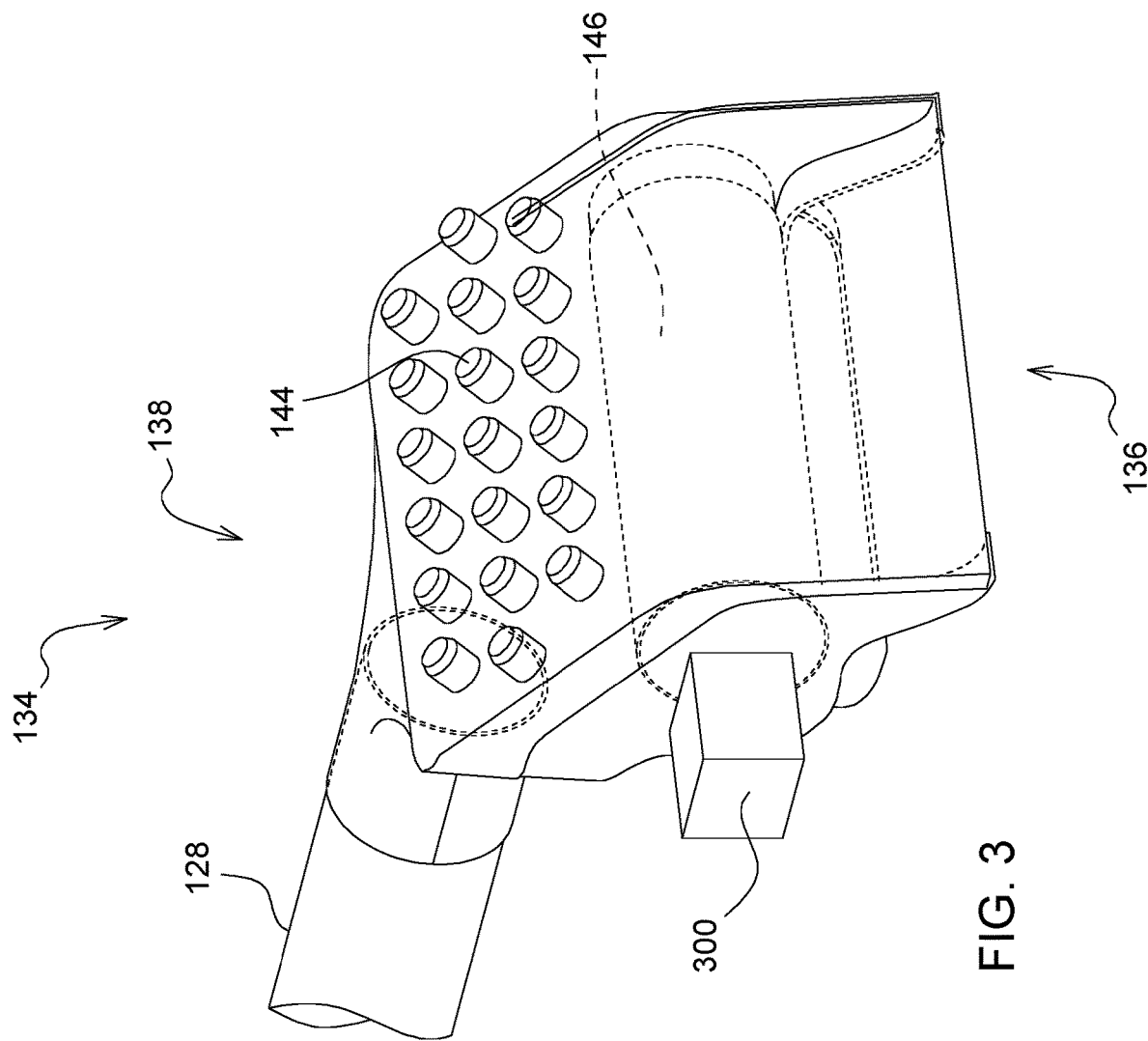
FIG. 3 is a perspective rear view of the electrostatic cleaner of FIG. 2.
Figure 4:
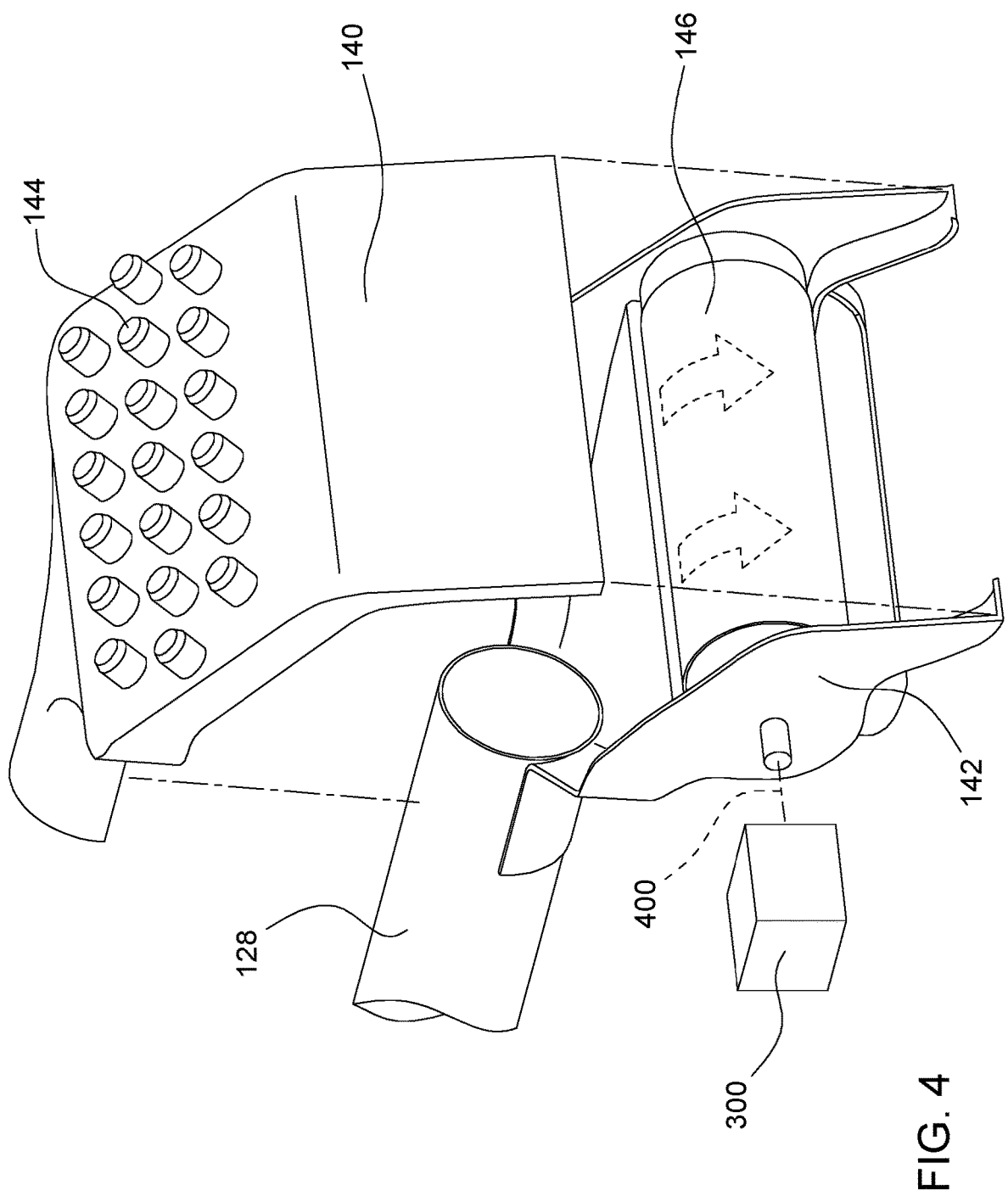
FIG. 4 an exploded view of the electrostatic cleaner of FIG. 3.

The charged drum 146 is connected to a motor 300 (FIG. 3) that rotates the charged drum 148 about the longitudinal axis 400 of the charged drum 146 in a direction such that the conductive surface 148 rotates in same direction as the direction of flow of the grain/dust/small particles through the electrostatic cleaner 134. The charged drum 146 receives the charged grain/dust/small particles after they have been charged by the charge injectors 144 and carries them toward the outlet 136.

The grain in the grain/dust/small particle mixture does not have a sufficient charge to be attached to the charged drum 146. The grain easily separates from the charged drum 146 and falls out of the outlet 136, generally following the flow path 204.

During typical harvesting operations, the agricultural combine operator will position the distal end of the unloading conveyor 128 over a grain cart or grain wagon such that the flow path 204 terminates in the grain cart or grain wagon, which collect the grain.

The dust and small particles, on the other hand, do not follow the flow path 204 into the grain cart or grain wagon. Instead, they are attracted to the charged drum 146, form a thin layer 206 on the conductive surface 148, and are carried around the underside of the charged drum 146.

The thin layer 206 is wiped off the conductive surface 148 on the back side of the charged drum 146 by a brush 208. The brush 208 breaks the dust and small particles loose and permits them to fall into a dust chamber 210. The dust chamber 210 wraps around the bottom surface of the charged drum 146, enclosing it, and extending substantially the entire length of the charged drum 146. Dust and small particles that fall into this dust chamber 210 are conveyed to an outlet channel 212 extending from the dust chamber 210. The outlet channel 212 directs the dust and small particles so they can fall to the ground away from the clean grain in the flow path 204 and away from the grain cart or grain wagon.

It may be desirable to remove the dust and small particles farther from the grain cart of the grain wagon. In this case, a flexible hose 214 can be coupled to the outlet channel 212. A fan 216 can be connected to the hose 214 to draw the dust and small particles far enough away from the outlet 136 of the electrostatic cleaner 134 so they cannot be blown back into the now double-cleaned grain.

The claims define the invention. The drawings and description are provided merely to illustrate at least one way of practicing the invention sufficient to enable someone skilled in the art to make and use the invention. Other ways of making and using the invention that are different than the ones illustrated herein can be readily devised by those skilled in the art.

What is claimed is:

1. An agricultural combine comprising:
a self-propelled agricultural harvesting vehicle;
a feederhouse extending forward from the vehicle;
a rotor and concave arrangement for threshing and separating grain received from the feederhouse;
a cleaning shoe disposed below the rotor and concave arrangement for cleaning grain;
a grain tank for receiving and accumulating grain from the cleaning shoe;
an unloading conveyor having a distal end for conveying grain from the grain tank; and
an electrostatic cleaner coupled to the distal end for electrostatically cleaning grain from the grain tank.

2. The agricultural combine of claim 1, wherein the electrostatic cleaner further comprises: a housing fixed to the distal end.

3. The agricultural combine of claim 2, wherein the electrostatic cleaner further comprises:
electrostatic charge injectors disposed to apply a charge to grain from the grain tank leaving the distal end.

4. The agricultural combine of claim 3, wherein the electrostatic cleaner further comprises:
a charged drum disposed inside the housing and located downstream of the electrostatic charge injectors to attract small particles intermixed with grain from the grain tank, the charged drum having a longitudinal axis.

5. The agricultural combine of claim 4, wherein the electrostatic cleaner further comprises a brush abutting the charged drum to brush the small particles off the charged drum, wherein the charged drum is driven in rotation about the longitudinal axis by a motor.

6. The agricultural combine of claim 4, wherein the charged drum is driven in rotation about the longitudinal axis by a motor.

7. The agricultural combine of claim 4, wherein the charged drum is a right circular cylinder.

8. The agricultural combine of claim 7, wherein the charged drum has a conductive outer surface.

9. The agricultural combine of claim 8, wherein the conductive outer surface comprises copper.

10. The agricultural combine of claim 3, wherein the electrostatic charge injectors are disposed in multiple rows extending across a width of the electrostatic cleaner.

11. The agricultural combine of claim 10, wherein the electrostatic charge injectors are disposed in a top cover of the electrostatic cleaner.

12. The agricultural combine of claim 11, wherein the electrostatic charge injectors extend downward from the top cover.

* * * * *